(12) United States Patent
Roering (10) Patent No.: US 7,329,161 B2
(45) Date of Patent: Feb. 12, 2008

(54) AMPHIBIOUS RECREATION VEHICLE

(76) Inventor: Thomas Roering, 631 Gosiwin Ave., Mahtomedi, MN (US) 55115

( * ) Notice: Subject to any disclaimer, the term of this patent is extended or adjusted under 35 U.S.C. 154(b) by 0 days.

(21) Appl. No.: 10/999,381

(22) Filed: Nov. 30, 2004

(65) Prior Publication Data

US 2006/0116032 A1   Jun. 1, 2006

(51) Int. Cl.
*B60F 3/00* (2006.01)
*B63H 19/08* (2006.01)
*B62D 61/12* (2006.01)

(52) U.S. Cl. ............... 440/12.5; 440/12.66; 280/43.17; 280/43.23

(58) Field of Classification Search ............... 440/12.5, 440/12.51–12.54, 12.66; 280/43, 47, 43.17, 280/43.18, 43.23
See application file for complete search history.

(56) References Cited

U.S. PATENT DOCUMENTS

| | | | | |
|---|---|---|---|---|
| 1,450,197 | A * | 4/1923 | Zwickey | 440/12.52 |
| 2,350,037 | A * | 5/1944 | Hofheins et al. | 440/12.53 |
| 3,191,963 | A * | 6/1965 | Prichard | 280/81.1 |
| 3,306,250 | A * | 2/1967 | Pitchford | 440/12.54 |
| 3,351,037 | A * | 11/1967 | Meili | 440/12.66 |
| 3,446,175 | A * | 5/1969 | Boehler et al. | 180/121 |
| 3,605,296 | A * | 9/1971 | Dysart | 37/322 |
| 3,777,919 | A * | 12/1973 | Konijn | 414/734 |
| 3,820,497 | A * | 6/1974 | Konijn | 440/12.5 |
| 3,903,831 | A * | 9/1975 | Bartlett et al. | 114/344 |
| 4,186,814 | A * | 2/1980 | Hart | 180/24 |
| 4,289,214 | A * | 9/1981 | Spence | 180/234 |
| 4,459,932 | A * | 7/1984 | Hildebrand | 440/12.64 |
| 4,817,553 | A * | 4/1989 | Knott, Sr. | 114/255 |
| 4,872,413 | A * | 10/1989 | Hebert | 440/12.7 |
| 5,176,098 | A | 1/1993 | Royle | |
| 5,632,221 | A | 5/1997 | Trenne et al. | |
| 5,687,669 | A * | 11/1997 | Engler | 440/12.52 |
| 6,159,058 | A * | 12/2000 | Matheson | 440/12.5 |
| 2004/0065242 | A1* | 4/2004 | Hough et al. | 114/125 |

FOREIGN PATENT DOCUMENTS

| | | | |
|---|---|---|---|
| DE | 10344957 A1 * | 4/2005 | |
| FR | 0543302 A * | 9/1922 | |
| FR | 2327878 A * | 6/1977 | |
| FR | 2395160 A * | 2/1979 | |
| GB | 2134857 A * | 8/1984 | |
| JP | 62139784 A * | 6/1987 | |
| JP | 01036510 A * | 2/1989 | |
| WO | WO 9315923 A1 * | 8/1993 | |

* cited by examiner

*Primary Examiner*—Ajay Vasudeva
(74) *Attorney, Agent, or Firm*—D L Tschida (57) ABSTRACT

An amphibious passenger vehicle having several open or covered holes and a surrounding cover to accommodate fishing and hunting. An aft mounted engine, forward/reverse transmission, drive linkage and disk/caliper brake assembly controls a pair of rear wheels. Electric, screw actuated cylinders and pistons or manual linkage control the steering of a pair of forward wheels. Independent front and rear elevation control linkages independently control the elevation of the fore and aft wheels.

21 Claims, 7 Drawing Sheets

AMPHIBIOUS RECREATION VEHICLE

BACKGROUND OF THE INVENTION

The present invention relates to amphibious vehicles and, in particular, to an all-terrain vehicle with flotation capabilities for use in activities such as duck hunting and ice fishing, among other outdoor recreational and commercial activities.

A variety of motorized all terrain vehicles (ATV) have been developed in recent years for recreational use. The vehicles typically include large floatation tires and multi-axle drive transmissions to permit travel over off-road terrain (i.e. sand, woods and swamp). Sportsmen frequently use versions of these vehicles that have 3, 4 or more wheels. Most of these vehicles do not accommodate amphibious use. Many of these vehicles have also been adapted to commercial uses such as farming and ranching.

One amphibious vehicle sold by Argo provides 8 driven wheels. The vehicle includes an uncovered, watertight passenger compartment.

Other amphibious vehicles adapted to the chassis of a car or boat are also known that provide floatation. The body is constructed to float and wheels are mounted to the associated frames to power the vehicle over land. Wheel support assemblies may also permit the elevation of the wheels while waterborne to reduce drag. U.S. Pat. Nos. 5,632,221 and 5,176,098 disclose two boat-like, amphibious vehicles with retractable wheels.

The present invention was developed to provide a hybrid, multi-wheel vehicle that is capable of travel over off-road terrain and water and, in particular, swamp, ice and snow, yet float in the event of ice breakage. The body provides a hull that is constructed to float. Several holes are included in a passenger compartment that can be aligned with drilled ice fishing holes. Electrically actuated cylinders and pistons coupled to fore and aft wheel assemblies permit a selective raising and lowering of the wheels, whereby the front and rear ends of the body can be raised and lowered relative to a desired support surface. Other electrically actuated cylinders and pistons and/or manual linkages are coupled to a steering linkage having double link arms to accommodate steering control. A gas motor, brake assembly and hand-operated tiller control and direct vehicle operation.

SUMMARY OF THE INVENTION

It is a primary object of the present invention to provide an amphibious all-terrain vehicle that is adapted to travel in swamps and over snow and ice.

It is a further object of the present invention to provide a vehicle that floats.

It is a further object of the invention to provide a vehicle wherein the drive wheels can be independently raised and lowered to lower the vehicle onto a support surface or facilitate extraction of the vehicle, such as after breaking through ice or when emerging onto soft soil.

It is a further object of the invention to provide a vehicle with electrically operated cylinders to control wheel elevation and steering.

It is a further object of the invention to provide a vehicle that can be fitted with external coverings adapted to sporting recreation activities, such as duck and goose hunting and/or ice fishing.

The foregoing objects, advantages and distinctions of the invention, among others, are found in a presently preferred assembly that provides a body having a passenger compartment that accommodate passenger seating for multiple individuals. Several open or covered holes in the passenger compartment open to the bottom of the vehicle to permit fishing through the vehicle floor. An aft mounted engine, forward/reverse transmission and disk/caliper brake assembly drives a pair of rear wheels via a drive linkage. A manual linkage or an electric, screw actuated cylinder and piston controls a steering linkage coupled to a pair of forward wheels. Separate forward and aft electric, screw actuated cylinders independently control the raising and lowering of the fore and aft wheels.

Still other objects, advantages and distinctions of the invention will become more apparent from the following description with respect to the appended drawings. Considered alternative constructions, improvements or modifications are described as appropriate. The singular features may also be combined into vehicles offering a variety of different combinations. The following description should therefore not be literally construed in limitation of the invention. Rather, the scope of the invention should be broadly interpreted within the scope of the further appended claims.

DESCRIPTION OF THE PREFERRED EMBODIMENT

Figure 1:
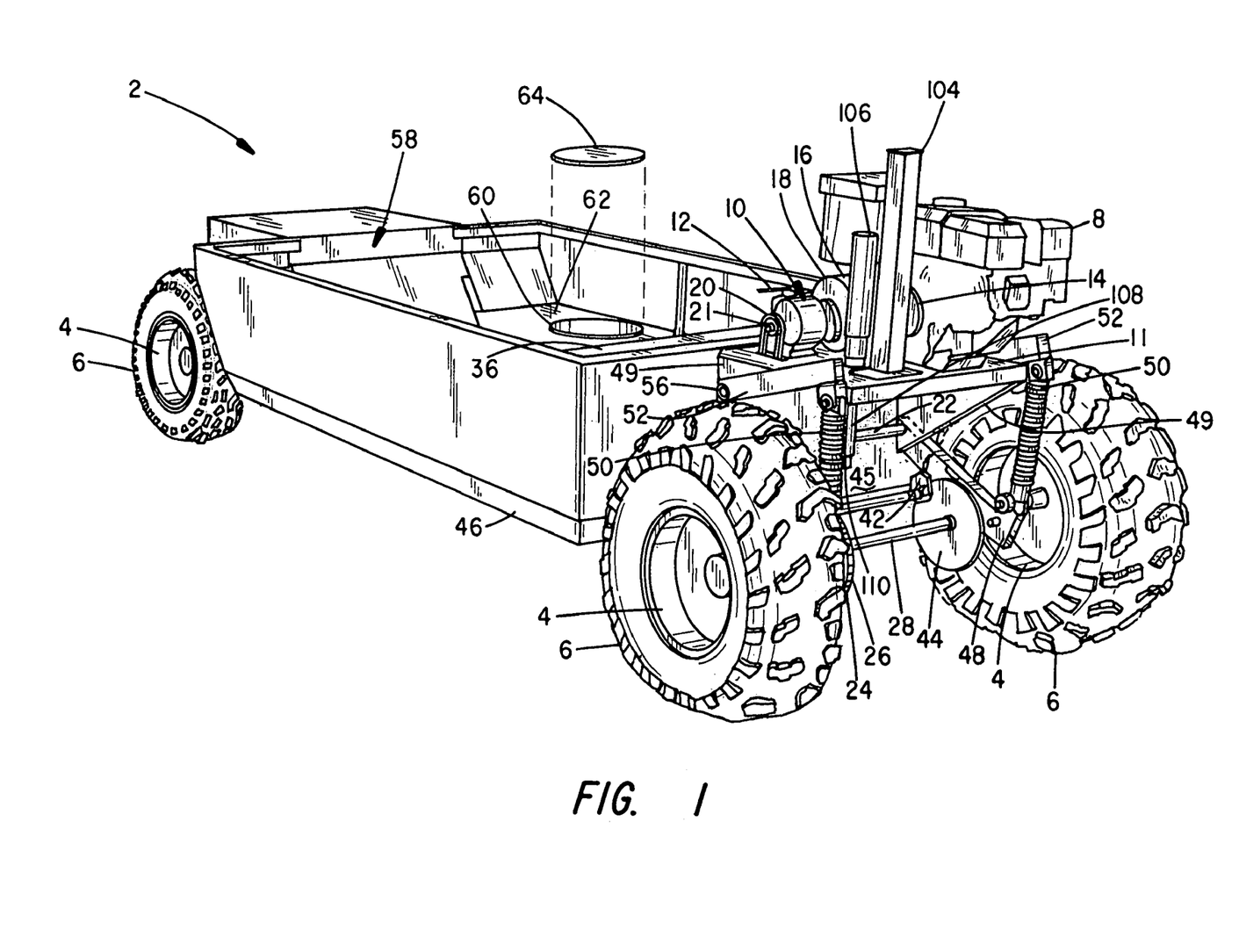
FIG. 1 shows a perspective view of the amphibious vehicle of the invention.

With attention to FIG. 1, a perspective view is shown to the amphibious vehicle 2 of the invention. The vehicle 2 is adapted to all terrain travel over sand, woods, mud, swamp, snow andlor ice via four wheels 4 that support lugged floatation tires 6. A two or 4 cycle gas engine 8 having a suitable horsepower rating sized to the vehicle 2 (e.g. 5 to 15 hp) provides drive power via a suitable transmission or gear box 10 that accommodates one or more forward speed ranges and/or reverse gearing. One or more handles 12 or other operator mechanisms control travel direction and/or select an appropriate gear range. The engine 8 and transmission 10 are supported on a platform 11 that projects from the aft end of the vehicle 2.

Figure 7:
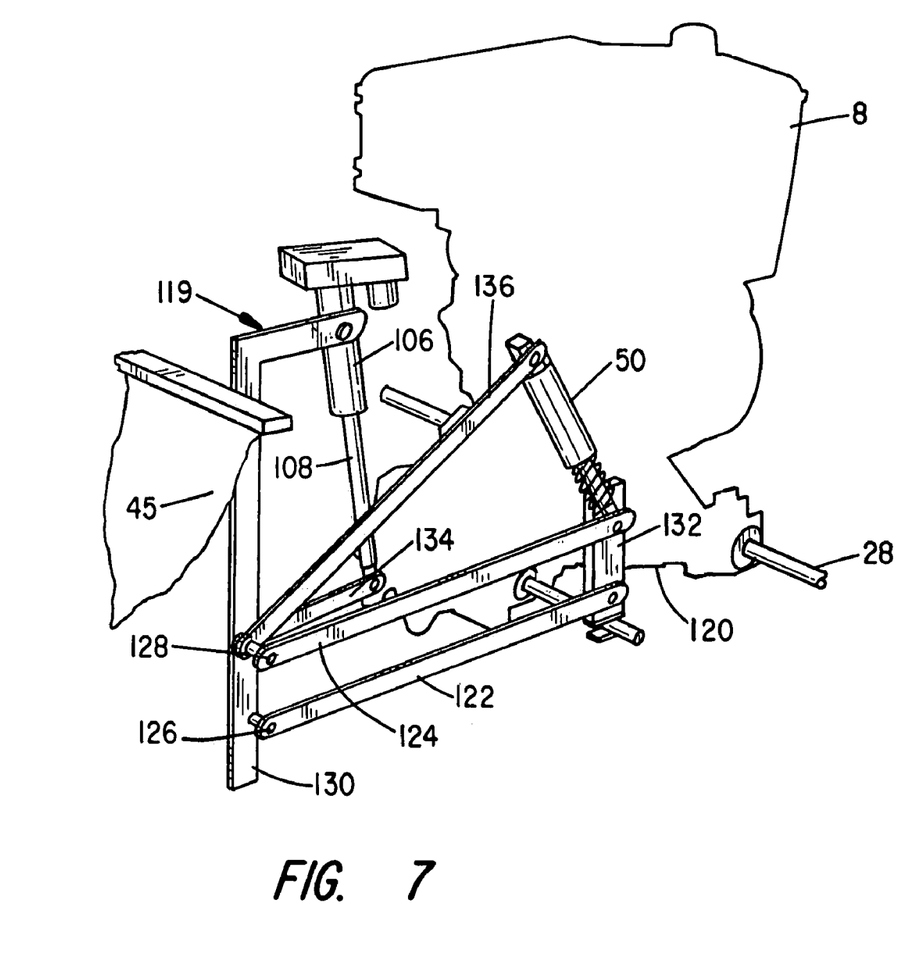
FIG. 7 shows a perspective view of an alternative mounting arrangement of a transaxle-based drive train and an elevation control support assembly.

For the depicted drive train, power is directed from the engine 8 to a power take-off pulley 14, belt 16 and transfer pulley 18 to the input side of the transmission 10. A chain 20 is coupled from a sprocket 21 at the output side of the transmission 10 to an idler axle 22 and idler sprocket 23 rigidly secured to the idler axle 22, see also FIG. 2. A second chain 24 is coupled from another idler sprocket 25 at the idler axle 22 to a drive sprocket 26 at a rear drive axle 28. Although a hybrid belt and chain drive linkage is shown, a chain drive, belt drive, shaft-drive, direct drive, transaxle or other suitable singular or hybrid drive linkage can be coupled between the engine 8 and rear axle 28 and rear wheels 4. The drive assembly may also be coupled to the front wheels, such as where a 4-wheel drive is desired. Preferably, the drive assembly should be low cost, safe and accessible to permit clearing of any debris or the like that might impede travel, and be sufficiently rugged to withstand the normal travel conditions. A transaxle-based assembly is shown at FIG. 7 and will be discussed below.

Figure 3:
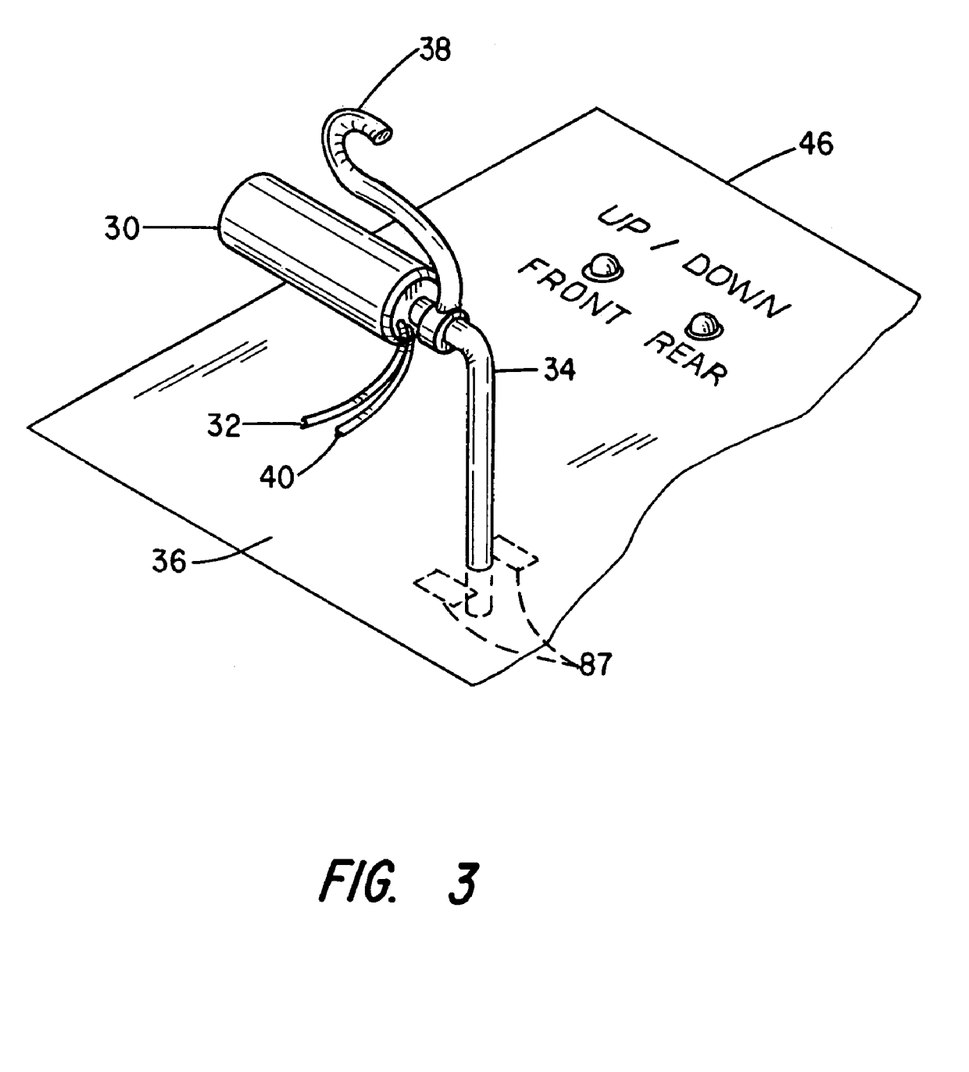
FIG. 3 shows a view of the tiller control for the throttle, steering, brakes and elevation of the amphibious vehicle of the invention.

A hand controlled throttle 30 and cable linkage 32 shown at FIG. 3 are secured to a tiller support arm 34 that extends from an interior operator's bench seat 36, that spans the width of the vehicle 2, to control the vehicle speed. A brake handle 38 and cable linkage 40 are also secured to the tiller arm 34 and control vehicle braking. The cable 40 mounts to a brake caliper 42 to control included brake pads (not shown) and the gripping of a rotor 44 secured to the drive axle 28.

The rear wheels 4 and idler and drive axles 22 and 28 are suspended from the chassis 46 at left and right, lower axle support arms 48. In particular, each end of the idler axle 22 is secured to a truss bracket 49 between a chassis rear wall 45 and the engine platform 11. The distal ends of the idler axle 22 extend through the truss brackets 49 and attach to the lower support arms 48, where the arms 48 are mounted to pivot about the ends of the axle 22. The interior ends of the lower support arms 48 are thereby mounted to pivot relative to the chassis 46 and the significance of which will become more apparent below. The outer ends of the drive axle 28 are separately mounted to extend through the outer ends of the lower support arms 48.

The bottom ends of shock absorbers 50 are anchored to pivotally extend above each of the lower support arms 48. The upper ends of the shock absorbers 50 are independently secured to left and right upper shock arms 52. The shock arms 52 pivot relative to the end wall 45 at a pivot axle 56 that extends through the trusses 49. Collectively, the arms 48 and 52 and shock absorbers 50 dampen shocks and other jostling motions encountered when traveling over typical off-road terrain. Although shock absorbers 50 are presently provided only at the aft end of the chassis 46, they could be added to the front end in a similar or other appropriate fashion, if desired.

The interior of the chassis 46 is formed to provide a passenger compartment 58. The compartment 58 contains the seat 36 and several holes 60 that are formed in a floor pan 62. The floor pan 62 is raised sufficiently above the floor bottom and water line of the vehicle 2 such that water will not enter the compartment 58 through the holes 60; for example, if the vehicle 2 breaks through ice or is otherwise floating on water. A cover 64 may also be mounted to each hole 60 to prevent water from splashing into the passenger compartment 58. The holes 60 find advantage when ice fishing and permit the operator and passenger(s) to fish directly from the vehicle 2. No other amphibious recreation vehicle is known that provides this convenience.

The buoyancy of the vehicle 2 is particularly advantageous in permitting safe fishing during early or thin ice conditions, when fish are typically active. Similarly, the vehicle 2 provides a safe mode of transport over frozen and partially frozen swamps and slews when duck and goose hunting. The vehicle 2 also finds use for rescue operations over thin ice, among a variety of other applications.

Figure 4:
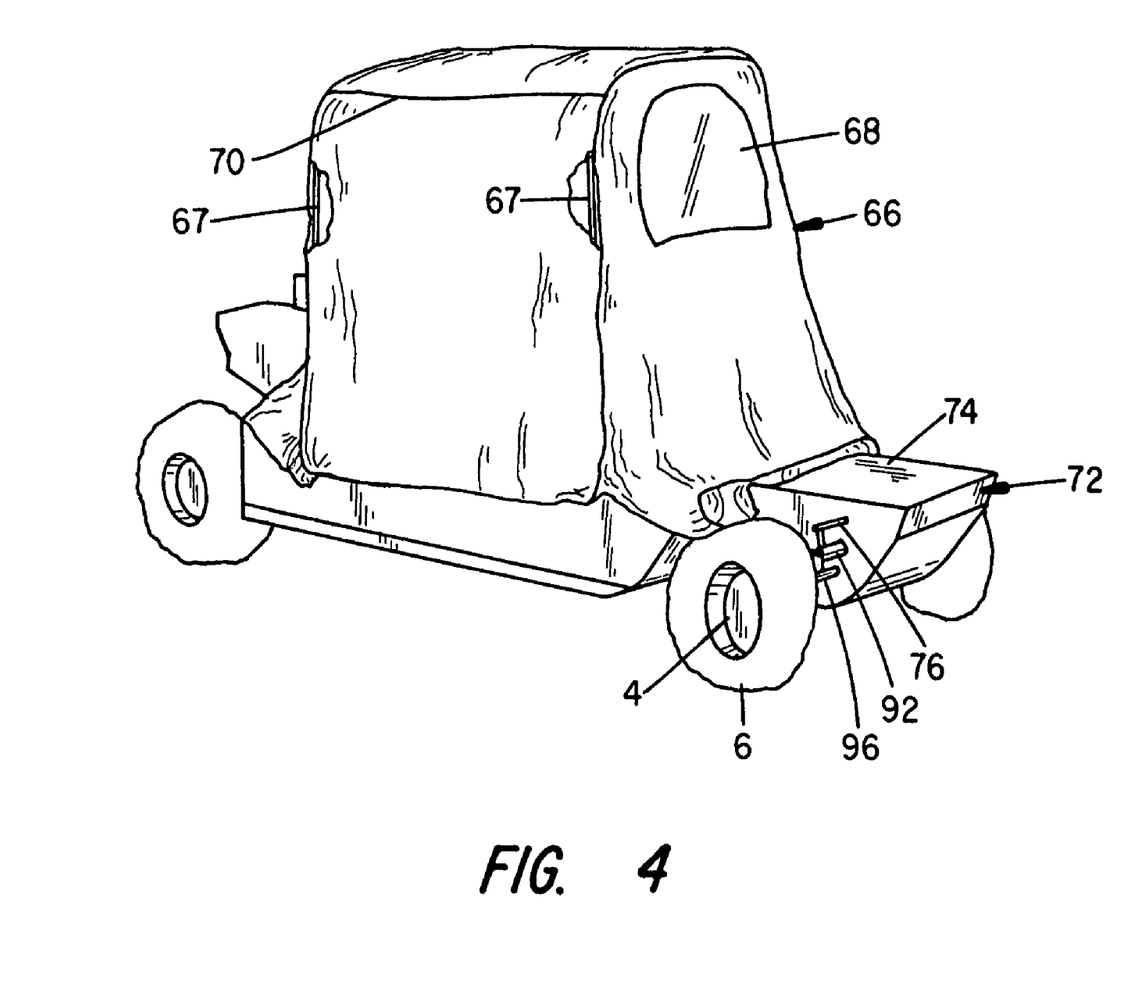
FIG. 4 shows a perspective view of the vehicle with a fabric enclosure.

To further facilitate use of the vehicle 2 during each of the former activities, an enclosure cover 66 is shown at FIG. 4 that can be secured to the chassis 46 to protect the passenger compartment 58 from the elements and seal in heat. The cover 66 can comprise any variety of constructions from molded or framed panel assemblies to fabric assemblies supported from a series of internal bowed struts or ribs that are mounted to the chassis 46. The cover assembly 66 can pivot relative to the chassis 46 or compartment 58 or may include a door of appropriate construction (not shown). A zippered window 68 and zippered top 70 opening facilitate access to the compartment 58. The cover 66 presently accommodates both ice fishing and duck hunting applications.

An alternative duck and goose hunting cover (not shown) might also be secured to the vehicle. Such a cover can comprise vertical, open-topped or hinged side and/or top frames. The sidewalls of the frames can be thatched with swamp grass and the like to camouflage the vehicle 2, yet permit shooting from the compartment 58.

Figure 5:
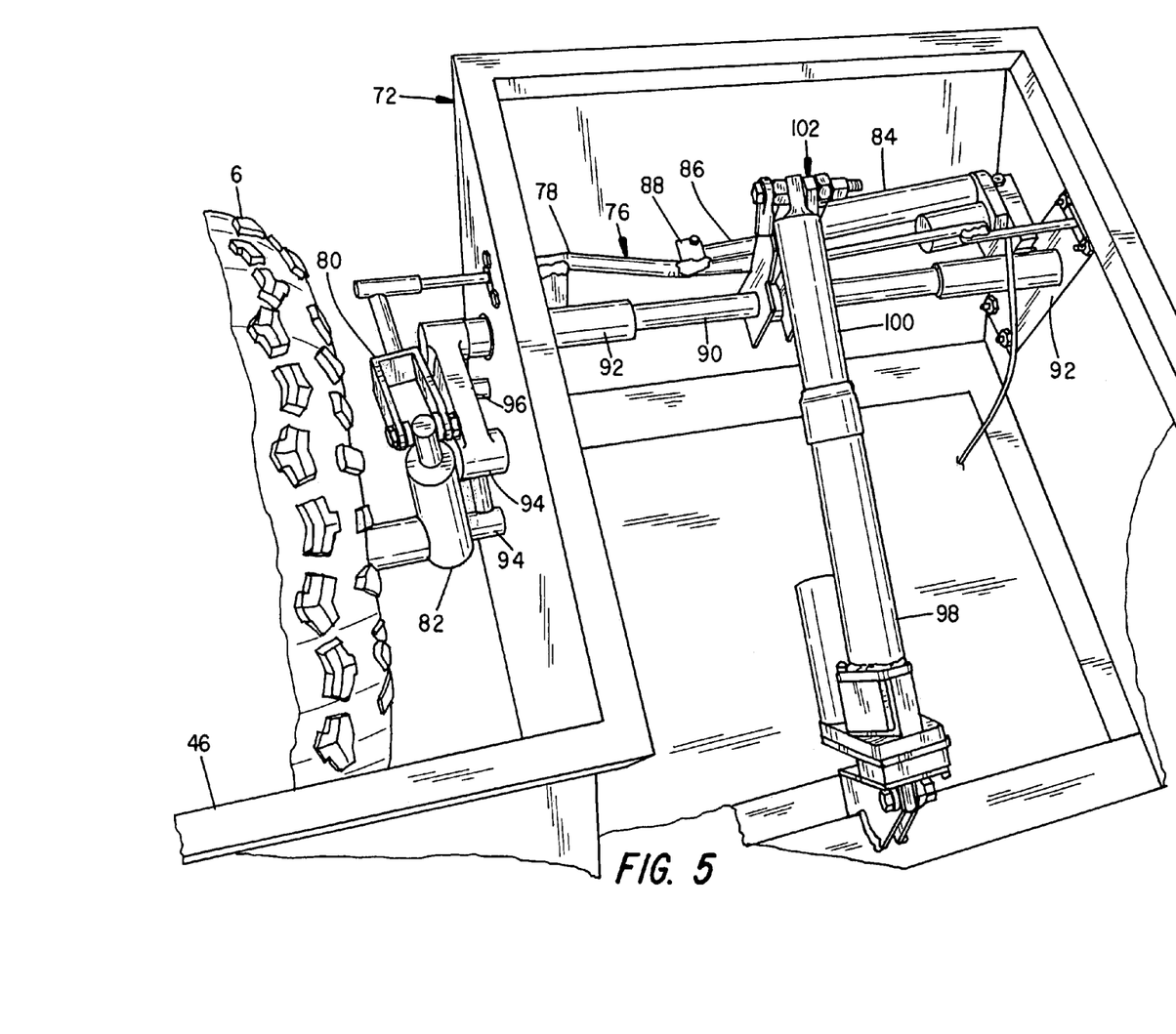
FIG. 5 shows a partially sectioned perspective view of an electrically controlled, front suspension of the vehicle.
Figure 6:
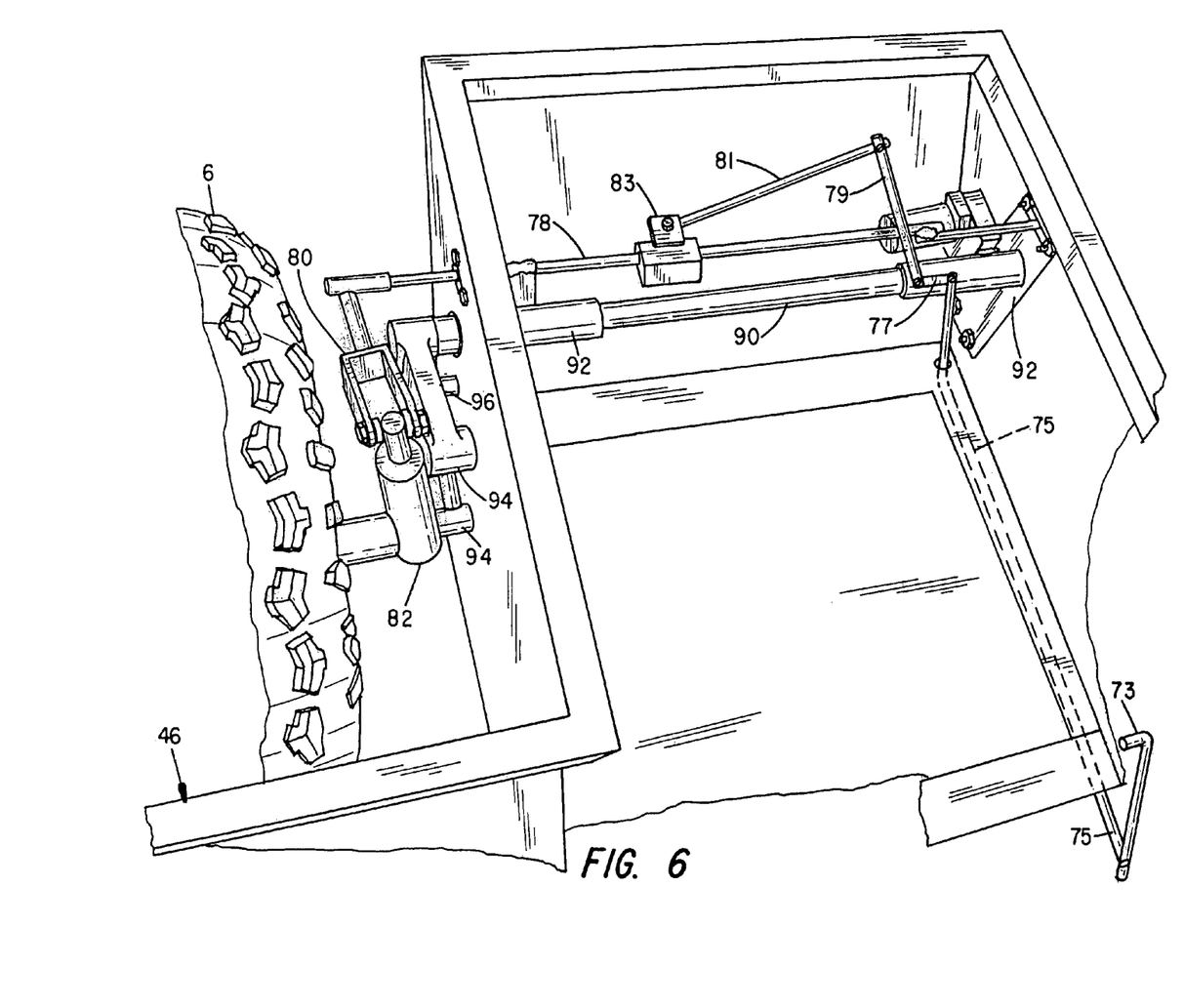
FIG. 6 shows a partially sectioned perspective view of a manually controlled front suspension of the vehicle.

Extending from the forward end of the vehicle 2 is a steering compartment 72 that is shown in FIGS. 5 and 6. The compartment 72 has a removable cover 74 that is constructed from floor plate. The upper surface of the cover 74 includes raised protrusions to prevent slipping, such as when accessing the front of the vehicle 2. Supported within the compartment 72 is an electrically controlled steering linkage 76.

A steering arm 78 extends laterally through the compartment 72 and couples at each distal end to a steering coupler 80 that is pivotally fitted to an axle support 82 at each of the front wheels 4. An electrically actuated, screw drive cylinder 84 and piston 86 is mounted to the compartment 72 and coupled to the steering arm 78 at a pivot coupler 88. Appropriate DC control signals are applied to the cylinder 84 via one or more switches 87 secured to the compartment 58 and coupled to movements of the tiller handle 34 to induce the piston 86 to extend and retract, which directs the steering arm 78 to turn the front wheels 4 right or left.

Although a single steering arm 78 is shown, multiple arms can be used. A manual, cable directed or other mechanical steering linkage might also be coupled to the tiller arm 34. An appropriate operator steering wheel, tiller, handle or other steering control device would be mounted adjacent the operator's seat 36 to direct the vehicle movements.

In the latter regard, an alternative manual steering linkage is shown at FIG. 6. The manual assembly includes a handle 73 that is fitted adjacent the seat 36. A link arm 75 of appropriate shape and/or numbers of pieces is pivotally coupled to the handle 73 and directed through and/or below or inside the chassis 46. Movement of the handle 73 is translated at link arms 77, 79 and 81 and transferred to laterally manipulate the steering arm 78. The link arms 77 and 79 are shown as being coupled to a pivot 81 mounted to the axle support 92, although a variety of pivot mountings can be employed.

Separately secured to each axle support bracket 82 is an elevation control linkage arm 90. The arm 90 is supported at sleeved, bearing support assemblies 92 fitted to the side walls of the compartment 72. Separate end couplers 94 pivotally couple the opposite distal ends of the arm 90 to each axle support bracket 82. A stub linkage arm 96 is secured to the compartment 72 and a second pivot coupler 94 extends from each arm 96 to each axle support bracket 82. The arrangement of double axle support arms 90 and 96 and linkage arms 94 provides a rugged and stable linkage to each axle support bracket 82 and whereby the front wheels 4 and tires 6 can be rotated into our out of engagement with the terrain.

Returning attention to FIG. 5, front wheel elevation is directed with a second electrically controlled, screw drive cylinder 98 that is secured to the compartment 72. A piston 100 is coupled to the control arm 90 with a pivoting coupler 102. The coupler 102 is secured to the arm 90 at a slot with a woodruff key, although alternative fastenings may also be used. With the application of suitable control signals applied via a "front—up/down" push button adjacent the operator's bench seat 36 (reference FIG. 3), the arm 90 can be rotated to elevate or lower the wheels 4. The front tires 6 are thereby lowered to engage the terrain to direct the vehicle 2 or raised to lower the front of the vehicle 2 onto the ground or ice.

Figure 2:
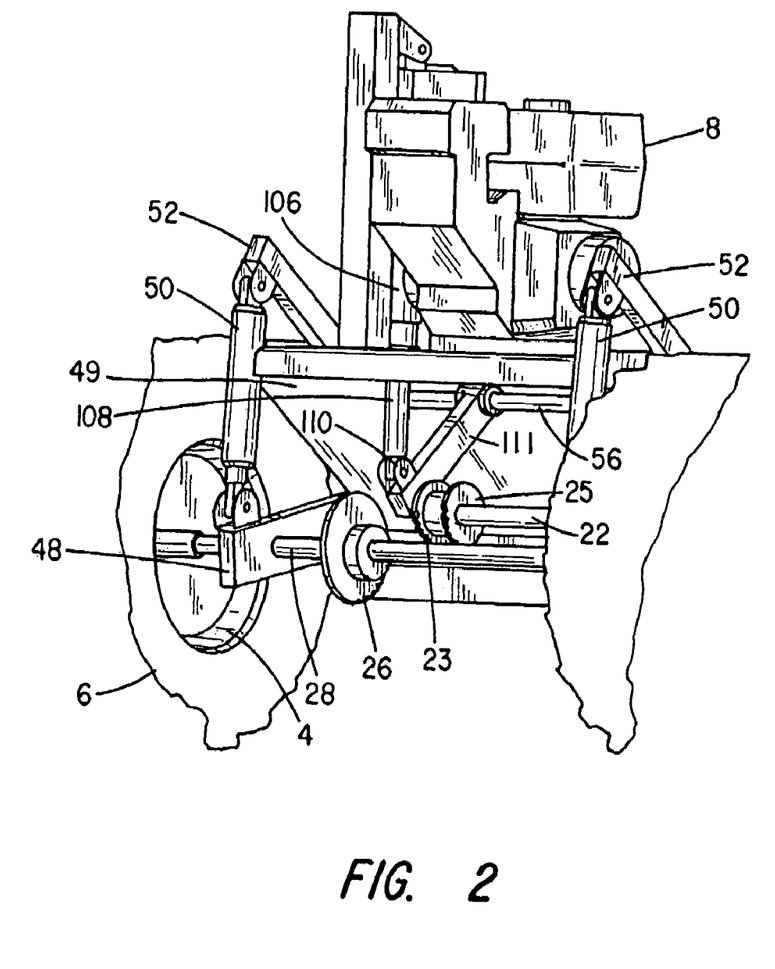
FIG. 2 shows a sectioned perspective view of the vehicle drive train.

The rear wheel elevation control linkage is shown at FIGS. 1 and 2. Separately attached to the engine platform 11 and supported from a vertical frame piece 104 is a third electrically actuated, screw drive cylinder 106 and piston 108. The extension and retraction of the piston 108 are independently controlled with a "rear—up/down" pushbutton mounted adjacent the operator's bench seat 36. A pivot coupler 110 is secured to the piston 108 and a transfer arm 111 is keyed to the pivot axle 56. Rotation of the axle 56 via movements of the piston 108 and arm 111 independently direct the raising and lowering of the lower control arms 48 and rear wheels 4.

The ability of the vehicle 2 to independently raise and lower the front and rear wheels 4 allows the operator to adjust the level of the chassis 46 when supported on the terrain. The separate elevation adjustment also permits the operator to extricate either the front or rear end of the vehicle 2 from ice of other crumbling terrain and find purchase to re-initiate travel. That is, by incrementally moving the vehicle 2 to and/or fro and incrementally and repeatedly elevating and lowering the vehicle 2 with each movement, the vehicle 2 can be made to effectively crawl onto either solid ice or ground, such as when the vehicle 2 breaks through thin ice or when departing or landing at a shoreline or land adjacent a swamp.

Although several screw actuated cylinders 84, 98 and 106 have been adapted to steer and control the elevation of the wheels 4 of the present vehicle 2, it is to be appreciated other mechanical, hydraulic or pneumatic linkages can be adapted to control vehicle steering and elevation. For example, FIG. 7 depicts a line diagram to one side of an alternative transaxle drive linkage and elevation control assembly. The engine 8 and a transaxle 120 of this linkage are secured to the rear wall 45 with a suitable support frame 119 and sets of laterally displaced parallel support arms 122 and 124 (only one set of which is shown). The sets of support arms 122 and 124 control the raising and lowering of the rear wheels 4 as described below. The transaxle 120 is constructed to receive the engine 8 at the top of the housing for the transaxle 120. The drive axles 28 extend transversely from the sides of the transaxle 120. A shift axle 121 is exposed at the transaxle 120 to accommodate coupling to an associated drive linkage (not shown).

The interior ends of the support arms 122 and 124 mount to the ends of pivot axles 126 and 128 at a bracket 130 fitted to the chassis 46. The outer ends of the arms 122 and 124 are secured to a bracket 132 mounted to the transaxle 120 and to either side of the engine 8. The electrically actuated, screw cylinder 106 and piston 108 depend from the bracket 130 and the piston 108 is pivotally coupled to an elevation control arm 134 that is rigidly keyed to the pivot axle 128. That is, the extension and retraction of the piston 108 rotates the axle 128 to lower and raise the wheels 4.

A pair of shock absorbers 50 are separately coupled to resiliently bias the engine 8 and transaxle 120 against the terrain. The shocks 50 mount between the bracket 132 and a pair of shock control arms 136 that separately pivot at the axle 128. Vibrations transmitted from the wheels 4 are thereby absorbed by the shocks 50 with movement of the arms 122, 124 and 136.

While the invention has been described with respect to presently preferred assemblies and considered alternative assemblies and improvements or alternatives thereto, still other assemblies may be suggested to those skilled in the art. It is also to be appreciated that selected ones of the foregoing components and subassemblies can be used singularly or can be arranged in different combinations to provide a variety of further improved amphibious vehicle assemblies. The foregoing description should therefore be construed to include all those embodiments within the spirit and scope of the following claims.

What is claimed is:

1. A vehicle comprising:
   a) a chassis having a passenger compartment constructed to float and wherein a hole extends through a floor panel above a water line of the chassis;
   b) an engine;
   c) a plurality of wheels;
   d) a front suspension having a front axle mounted to a forward end of said chassis and supporting a front one of said wheels, wherein a front steering linkage is mounted to direct the travel direction of said front wheel, wherein a first reciprocating piston is mounted to rotate said front axle to raise and lower the front wheel parallel to a longitudinal axis of said body, and wherein a second reciprocating piston is coupled to direct said steering linkage;
   e) a rear suspension having a rear axle mounted to an aft end of said chassis and supporting a rear one of said wheels, wherein a third reciprocating piston is mounted to rotate said rear axle to raise and lower the rear wheel in a plane parallel to a longitudinal axis of said body and wherein said first, second and third reciprocating pistons each include an electrically actuated, screw drive assembly;
   f) a tiller arm mounted to said compartment and coupled to a brake means; and
   g) control means coupled to said first, second and third reciprocating pistons to direct the raising and lowering of said front and rear wheels.

2. A vehicle as set forth in claim 1 wherein said first reciprocating piston is mounted to rotate an axle secured to said front axle.

3. A vehicle as set forth in claim 1 wherein a drive suspension includes a first control arm that supports a drive axle coupled to said rear wheel and an idler axle.

4. A vehicle as set forth in claim 3 wherein said rear axle is coupled to a first control arm pivotally mounted to said chassis and wherein said third reciprocating piston is mounted to rotate said first control arm.

5. A vehicle as set forth in claim 4 including a second control arm pivotally mounted to said chassis, wherein a shock absorber extends between said first and second control arms, and wherein said third piston rotates said second control arm.

6. A vehicle as set forth in claim 1 including an enclosure mounted to said passenger compartment having a plurality of resealable openings.

7. A vehicle as set forth in claim 1 wherein said brake means comprise a brake caliper and a rotor coupled to said rear wheel.

8. A vehicle as set forth in claim 1 wherein said tiller arm is coupled to said front steering linkage to direct vehicle travel.

9. A vehicle as set forth in claim 8 wherein said tiller arm includes a throttle control member and a control member coupled to said brake means.

10. A vehicle as set forth in claim 8 wherein said front steering linkage includes a plurality of control arms and a handle coupled to said control arms to manually direct said vehicle.

11. An amphibious vehicle comprising:
    a) a chassis having a passenger compartment constructed to float and wherein a hole extends through a floor panel above a water line of the chassis;
    b) an engine;
    c) a plurality of wheels;
    d) a front suspension having first and second front axles mounted to a forward end of said chassis and respectively to first and second ones of said wheels, wherein a front steering linkage includes a first reciprocating piston mounted to direct the travel direction of said first and second wheels, and wherein a second reciprocating piston is mounted to rotate said first and second front axles to raise and lower the first and second wheels in a plane parallel to a longitudinal axis of said body;
    e) a rear suspension having a rear axle mounted to an aft end of said chassis and to third and fourth ones of said wheels, wherein a third reciprocating piston is mounted to rotate said rear axle to raise and lower the third and fourth wheels in a plane parallel to a longitudinal axis of said body and including a brake caliper and a rotor coupled to said rear wheel and a tiller arm mounted to said compartment and coupled to said brake caliper to brake said rear wheel; and
    f) control means coupled to said second and third reciprocating pistons to respectively direct the raising and lowering of said first and second wheels and said third and fourth wheels.

12. A vehicle as set forth in claim 11 wherein said rear suspension includes first and second control arms that support said rear axle.

13. A vehicle as set forth in claim 12 wherein said rear suspension includes third and fourth control arms and wherein first and second shock absorbers respectively extend between said first and second and said third and fourth control arms.

14. A vehicle as set forth in claim 13 including a pivot axle coupled to said third and fourth control arms and wherein said third reciprocating piston is mounted to rotate said pivot axle and thereby raise and lower said third and fourth wheels.

15. An amphibious vehicle comprising:
    a) a chassis having a passenger compartment constructed to float and wherein a hole extends through a floor panel above a water line of the chassis;
    b) an engine;
    c) a plurality of wheels;
    d) a front suspension having first and second front axles mounted to a forward end of said chassis and respectively to first and second ones of said wheels and including a tiller arm mounted to said compartment and coupled to a front steering linkage to direct vehicle travel, wherein said front steering linkage includes a first reciprocating piston mounted to direct the travel direction of said first and second wheels, and wherein a second reciprocating piston is mounted to rotate said first and second front axles to raise and lower the first and second wheels in a plane parallel to a longitudinal axis of said body;
    e) a rear suspension including first and second control arms that support a rear axle coupled to third and fourth ones of said wheels and a pivot axle coupled to said first and second control arms and wherein a third reciprocating piston is mounted to rotate said pivot axle and said first and second control arms to raise and lower the third and fourth wheels in a plane parallel to a longitudinal axis of said body;
    f) control means coupled to said second and third reciprocating pistons to direct the raising and lowering of said first and second wheels and said third and fourth wheels; and
    g) brake means for braking said third and fourth wheels and wherein said tiller arm includes a control member coupled to operate said brake means.

16. A vehicle as set forth in claim 15 wherein said rear suspension includes third and fourth control arms and wherein first and second shock absorbers respectively extend between said first and second and said third and fourth control arms.

17. A vehicle as set forth in claim 16 wherein said pivot axle is coupled to said third and fourth control arms and wherein said third reciprocating piston rotates said pivot axle and said first, second, third and fourth control arms and thereby said third and fourth wheels.

18. A vehicle comprising:
    a) a chassis having a passenger compartment;
    b) an engine;
    c) a plurality of wheels;
    d) a front suspension having a front axle mounted to a forward end of said chassis and supporting a front one of said wheels, wherein a front steering linkage including a tiller arm is mounted to direct the travel direction of the front wheel, and wherein a first reciprocating piston is mounted to rotate said front axle and thereby raise and lower the front wheel parallel to a longitudinal axis of said body;
    e) a rear suspension having a rear axle mounted to an aft end of said chassis and supporting a rear one of said wheels, wherein a brake caliper and a rotor are responsively coupled to said tiller arm to brake said rear wheel, and wherein a second reciprocating piston is mounted to rotate said rear axle and thereby raise and lower the rear wheel in a plane parallel to a longitudinal axis of said body; and
    f) control means coupled to said first and second reciprocating pistons to direct the raising and lowering of said front and rear wheels.

19. A vehicle comprising:
    a) a chassis having a passenger compartment;
    b) an engine;
    c) a plurality of wheels;
    d) a front suspension having a front axle mounted to a forward end of said chassis and supporting a front one of said wheels, wherein a front steering linkage including a tiller arm having a throttle control member and a brake control member is mounted to direct the travel direction of said front wheel, and wherein a first reciprocating piston is mounted to rotate said front axle and thereby raise and lower the front wheel parallel to a longitudinal axis of said body;
    e) a rear suspension having a rear axle mounted to an aft end of said chassis and supporting a rear one of said wheels, wherein a second reciprocating piston is mounted to rotate said rear axle and thereby raise and lower the rear wheel in a plane parallel to a longitudinal axis of said body;

f) control means coupled to said first and second reciprocating pistons to direct the raising and lowering of said front and rear wheels; and g) brake means coupled to said brake control member for braking ones of said plurality of wheels.

20. A vehicle comprising:
a) a chassis having a passenger compartment constructed to float and wherein a hole extends through a floor panel above a water line of the chassis;
b) an engine;
c) a plurality of wheels;
d) a front suspension having a front axle mounted to a forward end of said chassis and supporting a front one of said wheels, wherein a front steering linkage is mounted to direct the travel direction of said front wheel, and wherein a first reciprocating piston is mounted to rotate said front axle to raise and lower the front wheel parallel to a longitudinal axis of said body;
e) a rear suspension having a rear axle mounted to an aft end of said chassis and supporting a rear one of said wheels, wherein a second reciprocating piston is mounted to rotate said rear axle to raise and lower the rear wheel in a plane parallel to a longitudinal axis of said body and including a brake caliper and a rotor coupled to said rear wheel and a tiller arm mounted to said compartment and coupled to said brake caliper to brake said rear wheel; and
f) control means coupled to said first and second reciprocating pistons to direct the raising and lowering of said front and rear wheels.

21. A vehicle comprising:
a) a chassis having a passenger compartment constructed to float and wherein a hole extends through a floor panel above a water line of the chassis;
b) an engine;
c) a plurality of wheels;
d) a front suspension having a front axle mounted to a forward end of said chassis and supporting a front one of said wheels, wherein a front steering linkage is mounted to direct the travel direction of said front wheel, and wherein a first reciprocating piston is mounted to rotate said front axle to raise and lower the front wheel parallel to a longitudinal axis of said body and including a tiller arm mounted to said compartment and coupled to said front steering linkage to direct vehicle travel, wherein said vehicle includes brake means, and wherein said tiller arm includes a throttle control member and a control member coupled to said brake means;
e) a rear suspension having a rear axle mounted to an aft end of said chassis and supporting a rear one of said wheels, wherein a second reciprocating piston is mounted to rotate said rear axle and thereby raise and lower the rear wheel in a plane parallel to a longitudinal axis of said body; and
f) control means coupled to said first and second reciprocating pistons to direct the raising and lowering of said front and rear wheels.

* * * * *